May 1, 1951           M. PINKERS           2,551,049
ROTARY GANG KNIFE FOR MEAT CHOPPING MACHINES
Filed Feb. 6, 1947
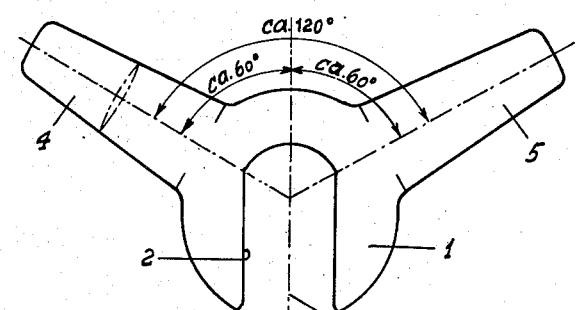
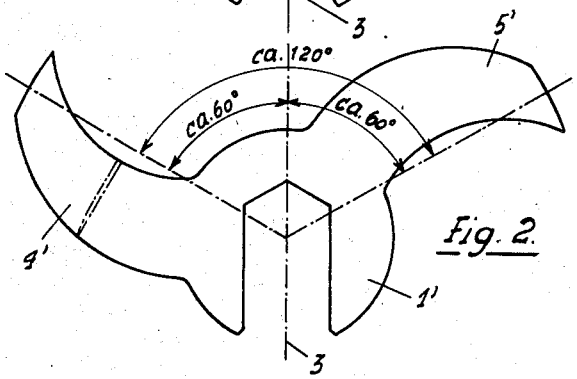
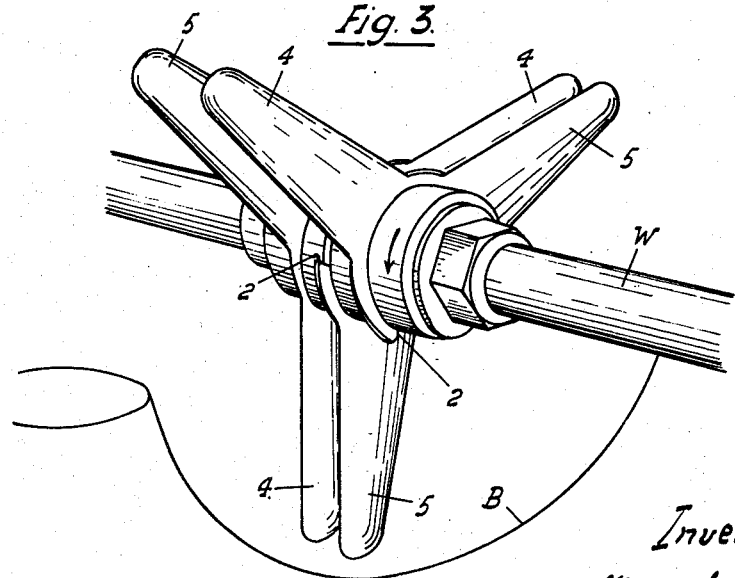
Inventor:
Marcel Pinkers
By H. E. Rowen Patented May 1, 1951

2,551,049

UNITED STATES PATENT OFFICE 2,551,049

ROTARY GANG KNIFE FOR MEAT CHOPPING MACHINES

Marcel Pinkers, Zurich, Switzerland

Application February 6, 1947, Serial No. 726,765
In Switzerland December 7, 1938

Section 1, Public Law 690, August 8, 1946
Patent expires December 7, 1958

4 Claims. (Cl. 146—121)

In order better to utilise the energy available for meat mincing machines (particularly a mincing machine having its own driving motor) and/or to increase the output, one has changed over from using single blade mincing cutters to cutters each having two or more blades.

The two-blade mincing cutters hitherto known have the disadvantage that either one of the two blades only can be adjusted right down to the trough of the mincing machine after having been re-ground, or if both blades are so adjustable, then these two blades have such a small distance one from the other that the trailing blade—on account of the very high number of revolutions of the mincing machine spindle (1200 R. P. M. and more) compared with the low number of revolutions of the trough—cannot effect a substantially efficient cutting action on the meat because there is much too small a passage in an axial direction between the two blades.

The efficiency of such a cutter is moreover reduced because—with a staggered mounting of three such cutters on the mincing machine spindle—the six blades (twice three) when viewed from the side are so distributed circumferentially that they almost fill the plane of rotation and consequently hamper the passage of the meat and/or its feed.

An object of the present invention is to overcome the above mentioned disadvantages of the known two-blade cutters, and to provide a knife gang composed of two-blade cutters so spaced as to produce an extraordinary increase in mincing efficiency.

According to the invention a two-blade cutter for a meat mincing machine is characterised in that its two blades are each arranged relatively to the centre line of the slot for engagement with the cutter spindle at an angle of at least approximately 60° on opposite sides of said centre line, so that the two blades include an angle of substantially 120°. This arrangement enables three such cutters to be mounted on the cutter spindle with the blades in three rows offset from one another 120° when viewed in an axial direction, each row consisting of a pair of blades one behind the other.

By way of example two embodiments of the invention are shown on the accompanying drawing, whereon:

Fig. 1 is a face view of a two-blade cutter having straight blades;

Fig. 2 is a similar view of a two-blade cutter having curved blades; and

Fig. 3 shows the staggered arrangement of three of the cutters on the spindle of a mincing machine.

The two-blade cutter according to Fig. 1 has a centre piece 1 with an open slot 2 in it for engagement with the cutter spindle W (Fig. 3). The two blades 4, 5 of this two-blade cutter extend from the centre piece 1 on both sides of the slot 2 and at an angle of at least approximately 60° with its centre line 3. Consequently the two blades 4, 5 include an angle of substantially 120°. The blades 4, 5 taper off conically in an outward direction and have cutting edges on both sides.

By the described and illustrated arrangement of the blades 4, 5 on the centre piece 1 both blades are capable of being adjusted and/or re-adjusted uniformly with respect to the bottom B (Fig. 3) of the trough of the mincing machine. Three such cutters forming a cutting set can be arranged on the mincing machine spindle W so as to show, when viewed as in Fig. 3, three rows of blades staggered by substantially 120° with respect to one another, with two of such blades in each row lying behind one another. The passage for the meat between these rows of blades is very wide in spite of the number of blades, so that the charge of meat contained in the trough of the mincing machine can be fed between the hampered and without any jamming occurring in front of the blades. The cutting edge of the rotating blades by said trough without being absolutely effective cutting action on account of trailing blade of each cutter can perform an the said wide spacing.

According to Fig. 2, curved blades 4', 5' are arranged on the centre piece 1' on both sides of the slot 2 at the before mentioned angle.

In both embodiments the blades extend from the closed end of the slot 2. They may, however, extend from the open end of the slot.

By the aid of two-blade cutters as described the output of the mincing machine has been increased up to about 30% and/or the working time required for the production of one batch (i. e. the quantity of minced meat required for the filling of the guts in the manufacture of sausages) is reduced by about 30%. Moreover a much better binding of the minced meat charge is achieved. Any heating of the meat when mincing is excluded when using the new two-blade cutters.

The cutter shown in Fig. 1 can be reversed since it has a double cutting edge.

I claim:

1. A cutter knife for a mincing machine having a slotted centre piece for mounting on a spindle and only two blades extending from the centre piece on opposite sides of the slot and at an angle of at least about 60° to the centre line of the slot, so that the two blades include an angle of substantially 120°.

2. A cutter knife for a mincing machine having a centre piece formed with a slot which is open at one end and closed at the other for mounting on a spindle, and only two blades extending from the centre piece near the closed end of the slot on opposite sides o fthe slot and at an angle of at least about 60° to the centre line of the slot, so that the two blades include an angle of substantially 120°.

3. In combination with a mincing machine spindle, a plurality of at least three cutter knives according to claim 1, arranged on the spindle to form three axial rows only with the corresponding blades of successive cutters displaced 120°.

4. In combination with a mincing machine spindle, a plurality of at least three cutter knives according to claim 2 arranged on the spindle to form three axial rows only with the corresponding blades of successive cutters displaced 120°.

MARCEL PINKERS.

REFERENCES CITED

The following references are of record in the file of this patent:

UNITED STATES PATENTS

| Number | Name | Date |
|---|---|---|
| 2,149,193 | Stock | Feb. 28, 1939 |
| 2,417,184 | Wagner | Mar. 11, 1947 |

FOREIGN PATENTS

| Number | Country | Date |
|---|---|---|
| 672,091 | Germany | Feb. 20, 1939 |
| 203,418 | Switzerland | June 1, 1939 |
| 206,702 | Switzerland | Nov. 16, 1939 |